United States Patent
Burgoon et al.

(10) Patent No.: US 9,889,833 B2
(45) Date of Patent: Feb. 13, 2018

(54) INTEGRATED PARKING BRAKE FOR DISK BRAKE

(71) Applicant: Performance Friction Corporation, Clover, SC (US)

(72) Inventors: Donald L. Burgoon, Gastonia, NC (US); Mark Wagner, Weddington, NC (US); Darin Cate, York, SC (US)

(73) Assignee: PERFORMANCE FRICTION CORPORATION, Clover, SC (US)

( * ) Notice: Subject to any disclaimer, the term of this patent is extended or adjusted under 35 U.S.C. 154(b) by 233 days.

(21) Appl. No.: 14/058,039

(22) Filed: Oct. 18, 2013

(65) Prior Publication Data

US 2014/0110196 A1 Apr. 24, 2014

Related U.S. Application Data (60) Provisional application No. 61/715,607, filed on Oct. 18, 2012.

(51) Int. Cl.
| | |
|---|---|
| *F16D 65/00* | (2006.01) |
| *B60T 13/22* | (2006.01) |
| *F16D 65/18* | (2006.01) |
| *F16D 121/04* | (2012.01) |
| *F16D 123/00* | (2012.01) |
| *F16D 121/06* | (2012.01) |

(52) U.S. Cl.
CPC ............. *B60T 13/22* (2013.01); *F16D 65/18* (2013.01); *F16D 2121/04* (2013.01); *F16D 2121/06* (2013.01); *F16D 2123/00* (2013.01)

(58) Field of Classification Search
CPC ............. F16D 2121/02; F16D 2121/04; F16D 2121/06; F16D 2125/02; F16D 2125/06; F16D 2125/66; F16D 65/18
USPC .............................. 188/72.3, 72.4, 72.7, 73.1
See application file for complete search history.

(56) References Cited

U.S. PATENT DOCUMENTS

| 2,466,526 | A | * | 4/1949 | Wolfram | ................. F16L 19/12 |
|---|---|---|---|---|---|
| | | | | | 285/104 |
| 3,592,164 | A | * | 7/1971 | Schultze | ................. F16F 9/364 |
| | | | | | 188/242 |
| 5,176,227 | A | * | 1/1993 | Kohler | .................. B60T 17/081 |
| | | | | | 188/153 R |
| 5,228,543 | A | * | 7/1993 | Heidenreich | ........... F16D 55/40 |
| | | | | | 188/264 E |
| 5,921,356 | A | * | 7/1999 | Stringer, III | ............ F16D 65/18 |
| | | | | | 188/196 D |
| 5,937,974 | A | * | 8/1999 | Cathcart | ............... B60T 17/083 |
| | | | | | 188/153 R |
| 6,484,852 | B1 | | 11/2002 | Bunker | |

(Continued)

*Primary Examiner* — Melody M Burch
(74) *Attorney, Agent, or Firm* — Roberts Mlotkowski Safran Cole & Calderon, P.C.

(57) ABSTRACT

A parking brake actuator for a disc brake caliper. The parking brake actuator includes a tapered collet having an axial bore, the tapered collet slidably positionable within a bore of the disc brake caliper; an actuator rod having a first end and a second end, the actuator rod slidably positionable within the axial bore of the collet; means for receiving a force for placing the parking brake actuator in a non-actuated condition; and a first biasing means structured and arranged to apply a force sufficient to place the parking brake actuator in an actuated condition when the force for placing the parking brake in a non-actuated condition is reduced or eliminated.

13 Claims, 6 Drawing Sheets

(56) References Cited

U.S. PATENT DOCUMENTS

| | | |
|---|---|---|
| 6,729,444 B1 | 5/2004 | Schmandt et al. |
| 6,851,761 B2 | 2/2005 | Baumgartner et al. |
| 7,455,152 B2 | 11/2008 | Wang |
| 7,559,413 B2 | 7/2009 | Haffelder et al. |
| 7,753,178 B2 | 7/2010 | Ohtani et al. |
| 8,091,689 B2 | 1/2012 | Tristano et al. |
| 2006/0131112 A1* | 6/2006 | Hashida .................. B60T 17/16 188/71.9 |
| 2009/0133973 A1 | 5/2009 | Shibata |
| 2009/0308700 A1* | 12/2009 | Mathern ............... B60T 17/086 188/167 |

* cited by examiner

INTEGRATED PARKING BRAKE FOR DISK BRAKE

RELATED APPLICATION

This patent application claims priority to Provisional Application Ser. No. 61/715,607 filed on Oct. 18, 2012, which is hereby incorporated by reference in its entirety.

FIELD

This invention relates to a parking brake for disk brakes which is integral with the disk brake calipers.

BACKGROUND

In the past, vehicle brakes were commonly of the drum/shoe design, having a pair of opposed arcuate brake shoes having a friction material disposed thereon within a hollow cylindrical drum. When the shoes were expanded, the friction material contacted an inner race of the drum to slow and/or stop the vehicle. In these designs, a relatively simple lever-actuated parking brake could be easily incorporated. However, with the advent of disc brakes, incorporation of a parking brake in the vehicle became more difficult.

One conventional design for a parking brake for disc brakes is known as a "drum-in-hat" assembly. Commonly, the rotating portion of a disc brake is known as a "top hat", which comprises an annular inner portion which is bolted to a vehicle hub, a generally cylindrical joining portion extending axially of the hub, and the brake rotor or disc itself, joined to the hub by the joining portion. According to the drum-in-hat parking brake design, the top hat has a conventional drum assembly incorporated therein, such as within the cylindrical joining portion of the top hat, wherein the inner surface of the joining portion is used as the drum, or even where a discrete drum is formed integral with the top hat at an inner portion thereof. U.S. Pat. No. 6,484,852 to Bunker and U.S. Pat. No. 6,729,444 to Schmandt et al. propose drum-in-hat parking brake designs. However, the complexity of drum-in-hat designs results in increased cost of manufacture, and somewhat poor reliability in the long run.

Integral disc brake calipers have been devised in the past and these typically have involved a hydraulic service brake actuator including a hydraulically driven piston, and a parking brake actuator which acts through a suitable mechanism to drive the piston in the manual parking brake mode. The arrangement is such that the hydraulic actuator is operable to shift the piston outwardly of a piston cylinder in which it is disposed, to engage a disc brake pad and to push the pad into engagement with the disc rotor. In some designs, engagement of the brake pad with the disc rotor can cause a second brake pad disposed on the opposite side of the rotor to shift into engagement with that side of the rotor and thus the rotor becomes sandwiched between the brake pads, producing a braking effect.

The parking brake actuator in such calipers is operable to produce the same movement of the disc brake pads to sandwich the rotor and in the known arrangements, the parking brake actuator has been operable to displace the service brake piston into engagement with the respective brake pad. To achieve that displacement, the parking brake actuator has been disposed within or partly within the cylinder which houses the service brake piston, to act on the piston when the parking brake is to be actuated. In this type of arrangement, the construction of the caliper can be quite complicated in order to accommodate the parking brake actuator partly or fully within the service brake piston cylinder and in particular, the complicated nature of the caliper arises somewhat because accommodation of the parking brake actuator in the piston cylinder introduces at least an additional leakage path, increasing the likelihood of leakage from the piston cylinder. Because there is a need to properly seal against the increased likelihood of leakage this invariably complicates the construction and reliability of the caliper.

Several designs have been proposed to address one or more of the above-mentioned drawbacks, problems, or limitations of parking brakes for disc brake equipped vehicles.

For example, U.S. Pat. No. 6,851,761 to Baumgartner et al. proposes a control process that can be carried out during parking braking by way of a parking brake arrangement. The brake is applied by way of a service brake cylinder, and a position of a piston rod is fixed by rotation of a self-locking rotating spindle and application of the rotating spindle to the piston rod or an element connected in front of the piston rod. By additionally rotating the rotating spindle during parking braking, compensation can be made for shrinkages, particularly of a brake disc and/or brake linings, which occur during brake cooling.

U.S. Pat. No. 7,455,152 to Wang proposes a disc brake caliper for use with a disc brake rotor having a first side and a second side. The caliper further includes a first mounting portion and a second mounting portion each positioned adjacent one side of the disc brake rotor. The caliper further includes brake pads disposed adjacent the respective mounting portions such that brake pads are on opposite sides of the disc brake rotor and in facing relationship therewith. Further, the disc caliper includes a hydraulic service brake actuator and an electric parking brake actuator, each of which is operable independently of the other. Each of the actuators is arranged for actuation against a second side of the first brake pad for displacing the first brake pad away from the first mounting portion and into engagement with the disc brake rotor. The hydraulic service brake and the electric parking brake actuators have positions of actuation on the second side of the first brake pad at positions spaced apart.

U.S. Pat. No. 7,559,413 to Haffelder et al. proposes an automatic parking brake, including a brake piston, an auxiliary piston, a hydraulic chamber disposed between the brake piston and the auxiliary piston, a spring element, for pre-stressing the auxiliary piston, a spindle device connected to the auxiliary piston via a threaded connection, and a drive for the spindle device, wherein in a locked state of the parking brake, the brake piston is mechanically locked via the spindle device and the spring-loaded auxiliary piston, and in a released state of the parking brake, the auxiliary piston is blocked by means of the spring element and/or by means of the spindle device.

U.S. Pat. No. 7,753,178 to Ohtani et al. proposes a disc brake with a parking brake mechanism capable of exerting a large piston thrust required for operating a parking brake, without adversely affecting operation of a service brake. A parking brake mechanism, which is driven by an electric motor provided outside a housing, is incorporated in a caliper in which a piston is slidably disposed in a cylinder. The parking brake mechanism is slidably fitted via a seal member into the piston and provided with a nut member that is prevented from rotating relative to the piston by engagement of a pin and a pin hole; and a shaft that is screwed into the nut member. During a service brake operation, the piston alone is moved by a hydraulic pressure under a small piston thrust. During a parking brake operation, the piston and the nut member are moved together by applying a hydraulic pressure and operating the electric motor at the same time, to exert a large piston thrust, by using a large pressure receiving area of the piston and the nut member combined.

U.S. Pat. No. 8,091,689 to Tristano et al. proposes an automatic parking brake acting on a disc brake and in which the piston of the brake comprises a cavity in which there is a spring allowing pressure to be applied to the end of the piston cavity. A washer is positioned between the inlet of the cavity and the spring. A pressing device allows pressure to be applied to the washer so that it preloads the spring.

U.S. Published Patent Application No. 2009/0133973 to Shibata proposes a parking brake apparatus including a first braking member provided at a wheel and integrally rotated with the wheel, a second braking member provided at a vehicle body side for stopping a rotation of the first braking member, a parking brake device for pressing the second braking member to the first braking member by an operating force of a parking brake operation, a pressurizing device for pressurizing a brake fluid independently of the parking brake operation, and a hydraulic pressure controlling device for preliminarily pressing the second braking member to the first braking member by a brake fluid pressure pressurized by the pressurizing device in a case when the second braking member is pressed to the first braking member by means of the parking brake device.

However, despite recent advances, there remains an unmet need in the art to optimize disc brake calipers employing integral parking brakes to improve the cost, performance and reliability thereof.

SUMMARY

In one aspect, provided is a parking brake actuator for a disc brake caliper. The parking brake actuator includes a tapered collet having an axial bore, the tapered collet slidably positionable within a bore of the disc brake caliper; an actuator rod having a first end and a second end, the actuator rod slidably positionable within the axial bore of the collet; means for receiving a force for placing the parking brake actuator in a non-actuated condition; and a first biasing means structured and arranged to apply a force sufficient to place the parking brake actuator in an actuated condition when the force for placing the parking brake in a non-actuated condition is reduced or eliminated.

In one form, the means for receiving a force for placing the parking brake actuator in a non-actuated condition comprises a piston, the piston axially aligned with the actuator rod and collet, the piston having a first end for contacting the second end of the collet, the first end structured and arranged to receive the second end of the actuator rod, the piston having a second end structured and arranged to receive the force for placing the parking brake actuator in a non-actuated condition.

In another form, the parking brake actuator further includes a second biasing means, the second biasing means positioned within the first end of the piston, the second biasing means structured and arranged to maintain the first end of the actuator rod in contact with a rear face of a disc brake pad of the disc brake caliper. In one form, the second biasing means is a compression spring providing a spring force of about 10 to about 40 pounds.

In yet another form, the tapered collet includes a first end and a second end, the first end having an outer diameter greater than the second end.

In still yet another form, the first biasing means is disposed annularly about the actuator rod.

In a further form, the parking brake actuator further includes a sleeve for receiving the tapered collet, the sleeve having an outer surface for engaging the bore of the disc brake caliper, the sleeve and the tapered collet forming a collet assembly.

In a still further form, the piston is moveably positionable within a cylindrical chamber of the disc brake caliper.

In a still yet further form, the second end of the piston includes a circumferential sealing means conforming to the chamber.

In one form, the force for placing the parking brake actuator in a non-actuated condition is a hydraulic force.

In another form, the disc brake caliper further comprises one or more fluid-actuated service brake actuators.

In still another form, the first and second ends of the tapered collet form first and second contact surfaces, respectively.

In still yet another form, the first biasing means comprises one or more Belleville washers. In one form, the one or more Belleville washers may provide a spring force of between about 1000 and about 5000 pounds. In another form, the one or more Belleville washers may provide a spring force of between about 2000 and about 3000 pounds.

In a further form, the parking brake actuator further includes an end cap having a seat for and abutting the first biasing means, opposite the tapered collet.

In a still further form, the first end of the actuator rod extends through a seal in the end cap and into contact with the rear face of the brake pad.

In another aspect, provided is a disc brake caliper having an integral parking brake, the disc brake caliper having disposed in a generally horizontal cavity therein a parking brake actuator structured and arranged to lock the parking brake by applying an actuation force in a direction away from a disc brake pad disposed within the caliper.

In one form, the parking brake actuator includes an actuator rod disposed within a tapered collet, wherein the actuator rod is locked by the tapered collet against a rear face of the disc brake pad when the parking brake is applied.

In another form, the collet assembly comprises a collet within a sleeve and the force is applied to the collet. In one form, the force is spring force. In another form, the spring force is generated by Belleville washers.

In still another from, the parking brake actuator is structured and arranged to release the parking brake by a force applied to the collet in a direction toward the disc brake pad.

In still another aspect, provided is a disc brake caliper comprising a service brake actuator disposed in a first cavity therein and a parking brake actuator disposed in a second cavity therein, wherein the parking brake actuator comprises an actuator rod disposed within a collet assembly comprising a collet within a sleeve, and is structured and arranged to lock the parking brake by a force applied to the collet in a direction away from a rear face of a disc brake pad disposed within the caliper.

In one form, the actuator rod is locked by the collet assembly against the rear face of a disc brake pad when the parking brake is applied.

In another form, the parking brake actuator is structured and arranged to release the parking brake by a force applied to the collet in a direction toward the rear face of the disc brake pad.

In still another form, the parking brake actuator further includes an actuator rod having the collet assembly annularly surrounding the actuator rod between first and second ends of the rod; a cup having open and closed ends, the open end disposed around the first end of the actuator rod and extending to and abutting one side of the collet; pushing means abutting the closed end of the cup opposite the first end of the actuator rod; first spring means disposed annularly around the actuator rod abutting an opposite side of the collet; and an end cap having a seat for and abutting the spring means, opposite the collet assembly from the spring means.

In still yet another form, the pushing means comprises a cylindrical chamber, a piston having a fluid contacting surface and circumferential sealing means conforming to the chamber, a fluid and a fluid inlet fitting sealing the chamber, wherein the fluid inlet communicates with the piston.

In a further form, the closed end of the cup is integral with the piston and opposite the fluid contacting surface.

In a still further form, the sleeve has a cylindrical inner surface, and the collet has a tapered outer surface and first and second contact surfaces at longitudinal ends thereof, In a still yet further form, the disc brake caliper further includes a second spring means between and abutting the first end of the actuator rod and the closed end of the cup, biasing the actuator rod into contact with the rear face of the brake pad.

In one form, the second end of the actuator rod extends through a seal in the end cap and into contact with the rear face of the brake pad.

Other features and advantages of the present invention will appear from the following description in which the preferred embodiments have been set forth in detail in conjunction with the accompanying drawings.

BRIEF DESCRIPTION OF THE DRAWINGS

Notwithstanding any other forms that may fall within its scope, one preferred form of the invention will now be described by way of example only with reference to the accompanying drawings. Throughout the drawings identical structures are identified by identical reference numerals.

DETAILED DESCRIPTION

Described herein is an integral disk brake caliper which incorporates both the vehicle service brake and the parking brake into a single caliper. Advantageously, the service brake and the parking brake are separately provided within the caliper, and both can be fluid-actuated, such as by hydraulic fluid or even pneumatically. In an alternative design, the parking brake can be actuated by separate means, such as by an electric motor.

Regulations require that vehicle parking brakes not be dependent on the integrity of the service braking system, such that for example if a hydraulic or pneumatic failure occurs in the braking system, or when the vehicle is not in use, the parking brake remains actuated. This requirement has been the source of difficulty in designing integral disk brake calipers, since the service brake pistons operating the brake pads are generally actuated by hydraulic or pneumatic pressure. A loss of such pressure results in the brake pistons retracting, or at least not being sufficiently pressurized against the brake pads to prevent the vehicle from moving. As discussed above, there have been many efforts to overcome this difficulty, either by modifying the service brake piston design to incorporate a parking brake design, or by providing an entirely separate parking brake system, either within or outside of the brake caliper.

According to the present invention, a parking brake actuator which comprises a collet assembly is incorporated into a cavity in a conventional service brake caliper, but in a cavity separate from that for the service brake piston(s). The parking brake actuator is used to mechanically lock the parking brake in the "on" state when fluid pressure is removed from the brake caliper, using the same brake pads as are used for the service brake. Since the parking brake actuator system is separate from that of the service brake, but incorporated into the same caliper and uses the same brake pads, a great savings in cost and complexity can be realized.

A "collet" is a holding device that forms a collar around an object to be held and exerts a strong radial clamping force on the object when it is tightened, usually by means of a tapered outer collar. The collet is a sleeve with a (normally) cylindrical inner surface and a conical outer surface, and is conventionally squeezed against a matching taper, such that its inner surface contracts to a slightly smaller diameter, squeezing the workpiece whose secure holding is desired.

The parking brake actuator of the present invention utilizes a collet assembly, in which a collet is moveably disposed within a fixed cylindrical sleeve. When the collet is pushed in one longitudinal direction relative to the sleeve, the collet is squeezed together so as to wedge its inner surface against an actuator rod held within the collet, preventing longitudinal movement of the actuator rod. When the collet is pushed in the opposite longitudinal direction, the radial force applied by the wedge on the actuator rod is released, and the actuator rod is free to move longitudinally within the collet assembly.

In order to lock the actuator rod within the collet, and thus the parking brake actuator, one or more Belleville washers are used to apply force to one end of the collet so as to force it into its sleeve and apply radial pressure on the actuator rod.

A "Belleville washer", also known as a coned-disc spring, conical spring washer, disc spring, Belleville spring or cupped spring washer, is a type of spring shaped like a washer. It has a frusto-conical shape which gives the washer a spring characteristic. Belleville washers are typically used as springs, or to apply a pre-load or flexible quality to a bolted joint or bearing. Advantageously, multiple Belleville washers may be stacked to modify the spring constant or amount of deflection. Stacking in the same direction will add the spring constant in parallel, creating a stiffer joint (with the same deflection). Stacking in an alternating direction is the same as adding springs in series, resulting in a lower spring constant and greater deflection. Mixing and matching directions allow a specific spring constant and deflection capacity to be designed.

Of course, the spring force applied against the collet can be produced by an alternative device, such as a compression spring.

Importantly and in contrast to conventional parking brake designs, the parking brake locking force of the present invention is applied in a direction opposite to the force applied to actuate the service brake, i.e. in a direction away from the rear surface of the brake pad(s). The operation and advantages of this system will become apparent in the description below.

Figure 1:
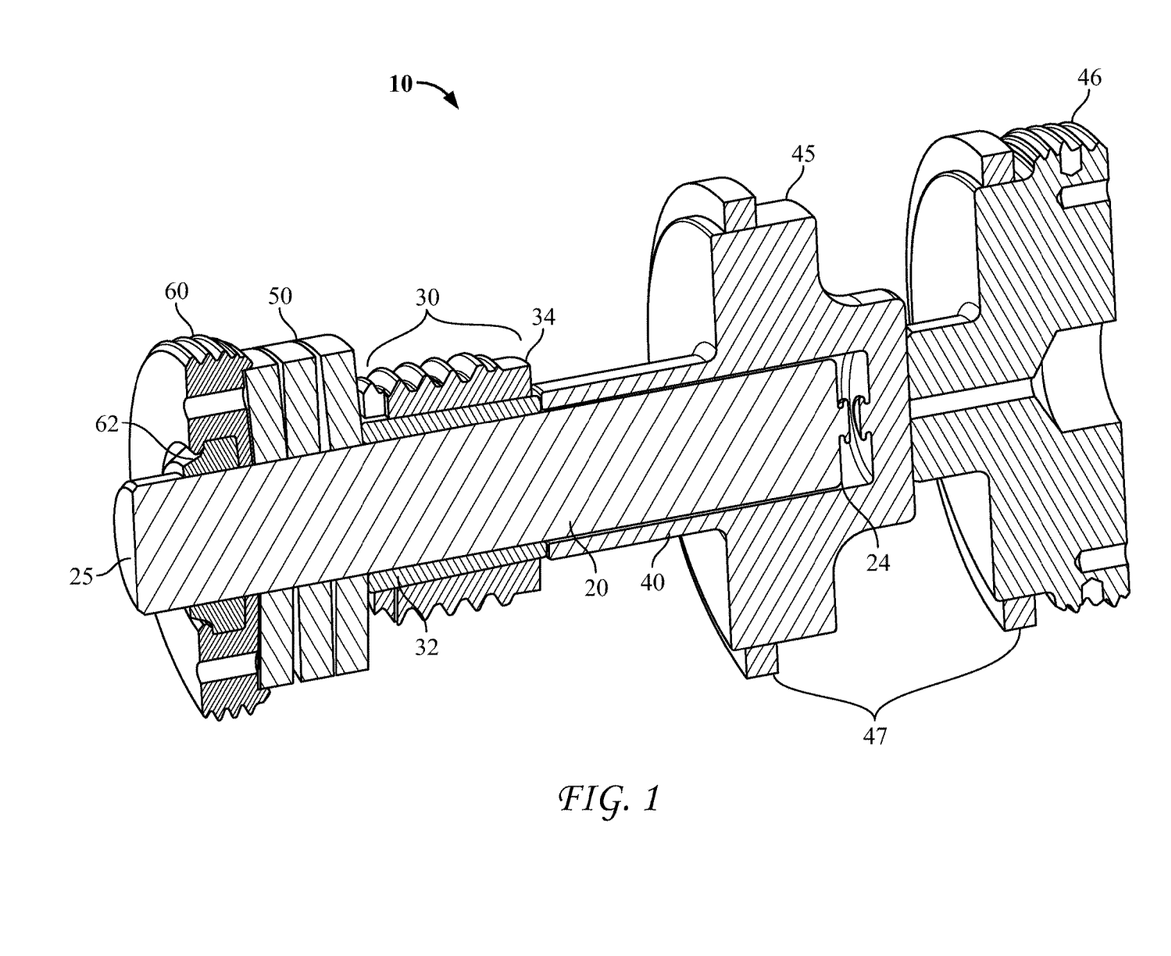
FIG. 1 is a sectional view of a parking brake actuator according to the present invention.
Figure 2:
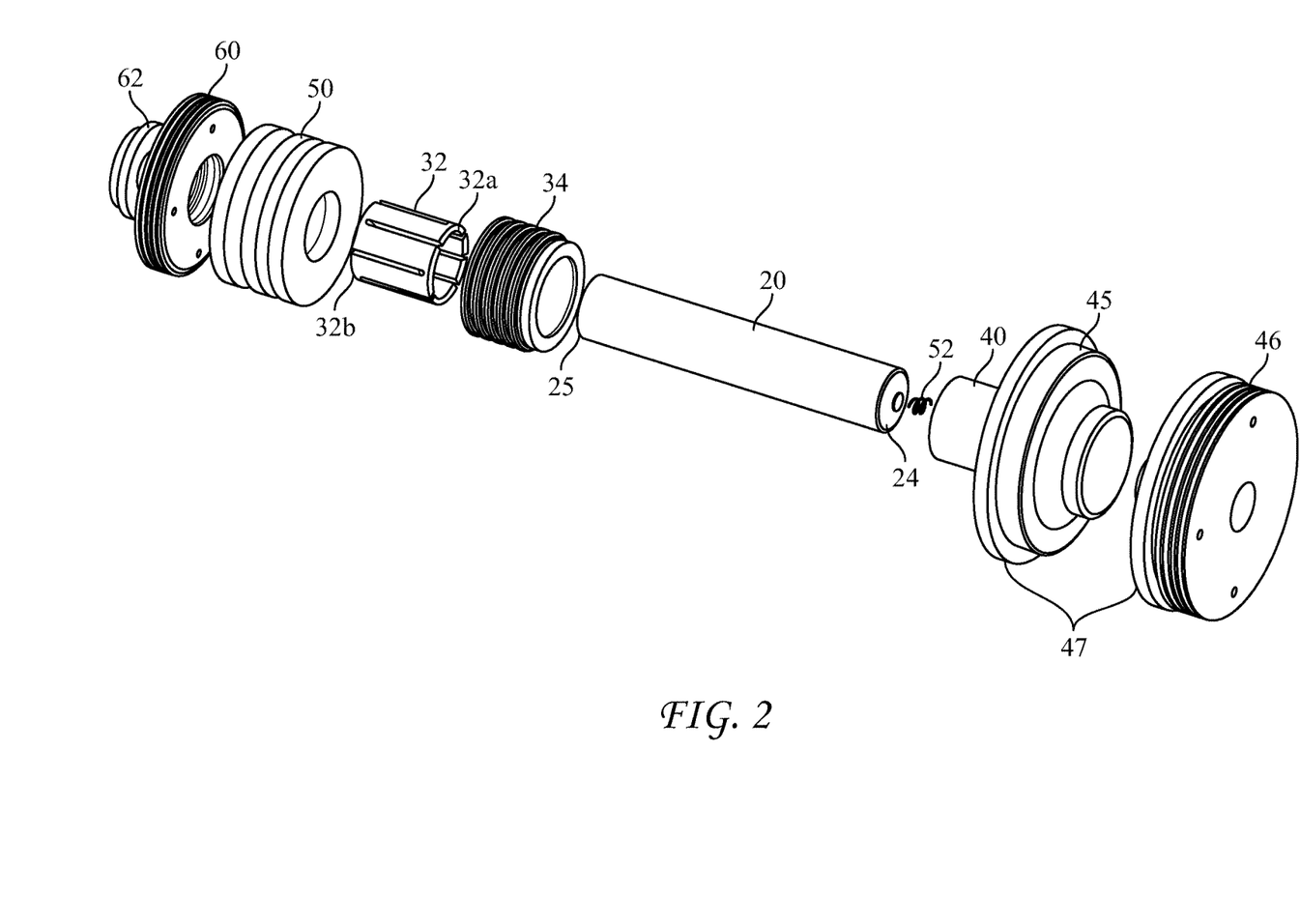
FIG. 2 is an exploded view of the parking brake actuator according to FIG. 1.

FIGS. 1 and 2 illustrate the parking brake actuator (10) of the present invention, both in assembled form (FIG. 1) and in an exploded view (FIG. 2). The parking brake actuator (10) comprises an actuator rod (20) surrounded by a collet assembly (30) having a collet (32) with a tapered outer surface, having first and second contact surfaces (32a and 32b respectively) at longitudinal ends thereof, disposed within a sleeve (34). For simplicity, the sleeve (34) can have a cylindrical inner surface, but could be configured to have a tapered inner surface matching or approximating the taper on the outer surface of collet (32). A first end of the actuator rod (24) is disposed within a cup (40) having an open end and a closed end, the open end of the cup extending to and abutting one side of the collet (32). In this particularly preferred embodiment, the closed end of cup (40) is integral with a piston (45) and opposite a fluid contacting surface (45a) of piston (45) (FIG. 3), which coacts with a pressurized fluid introduced to the system through fluid inlet (46), to form a pushing means for pushing the collet (32) in a direction (to the left in FIG. 1) to release the radial force applied to actuator rod (20). Sealing means (47), such as o-rings or their equivalents, are provided on the circumference of both piston (45) and fluid inlet fitting (46) and conforming to a cylindrical chamber (48) (FIG. 3) to effectively seal the pressurized fluid between the two. The pushing means applies sufficient pressure to overcome the spring force of a first spring means (50), which can be one or more Belleville washers, pushing the first spring means against its seat in end cap (60), and leaving the actuator rod (20) free to move longitudinally within the collet/sleeve assembly. A second end of the actuator rod (25) extends through a seal (62) provided in end cap (60), and is normally biased into contact with the rear face of the brake pad(s) (not shown) of the disk brake caliper by a second spring means (52) disposed between and abutting the first end of the actuator rod (24) and the inside of the closed surface of cup (40).

Figure 3:
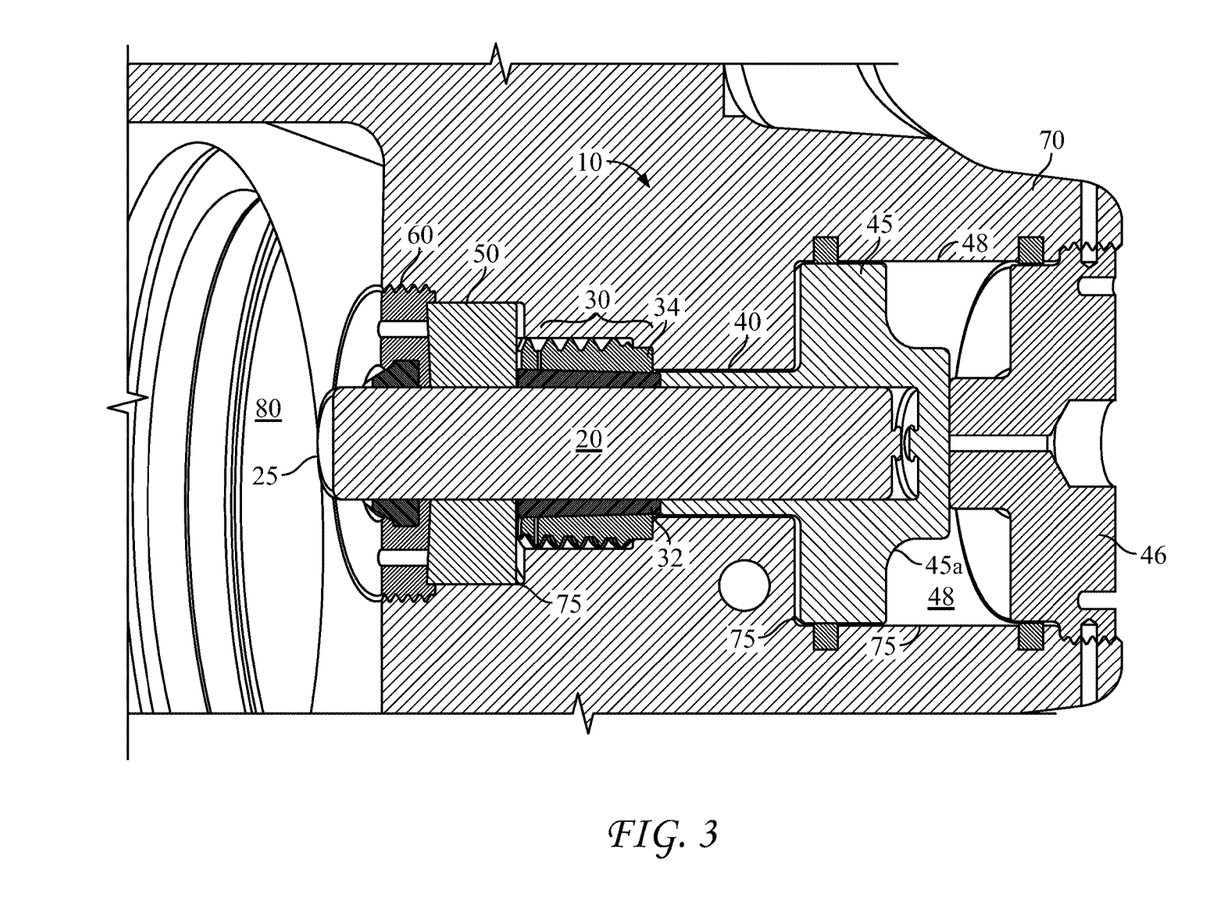
FIG. 3 is sectional view of the parking brake actuator according to FIG. 1, disposed within a cavity of a disk brake caliper.

FIG. 3 illustrates the parking brake actuator (10) disposed within a (generally horizontal) cavity (75) of a brake caliper (70). For reference, the service brake piston cavity (80) is depicted behind the parking brake actuator (10). This view clarifies the communicating relationship between piston (45), particularly at the fluid contacting surface (45a), and fluid inlet fitting (46), which in combination with the inner surface of the cavity (75) form a cylindrical chamber (48), which can be pressurized with a fluid (not shown) to form a pushing means, and subsequently depressurized as needed. FIG. 3 further illustrates that the sleeve (34) of collet assembly (30) has a threaded outer surface which is threaded into the cavity (75), and a cylindrical inner surface which coacts with the tapered outer surface of collet (32).

The operation of the present invention will now be explained referencing to FIGS. 1-3. During normal operation of the vehicle, the parking brake actuator mechanism is deactivated by force applied by the pushing means, e.g. the combination of the fluid inlet fitting (46), cylindrical chamber (48), piston (45) and a pressurizing fluid, in the left direction of FIG. 3. The extended portion of cup (40) presses against the first longitudinal contact surface (32a) of collet (32) with enough force, typically about 2500 psig, to overcome the counteracting force of and compress first spring means (50). Of course, in the alternative the pressure can be supplied by an electrical motor, such as a stepper motor, in combination with a threaded rod, the arrangement of which would be well within the skill of the skilled artisan and need not be detailed herein. Collet (32) is consequently pushed to the left in the FIG.s through sleeve (34), such that no wedging effect occurs between sleeve (34) and collet (32), and no radial pressure is exerted on actuator rod (20). Thus, the actuator rod is free to move longitudinally within cup (40), collet (32), first spring means (50) and seal (62). As stated above, second spring means (52), having a spring force of between about 10-20 psig, is provided to bias the second end (25) of actuator rod (20) against the rear face of a brake pad within the brake caliper.

When the vehicle is stopped, in order to set the parking brake, the vehicle operator will maintain pressure on the service brakes in order to keep the brake pads in place against the rotor. Through a series of suitably arranged fluid valves, pressure is released in cylindrical chamber (48), and the combination of collet (32), cup (40) and piston (45) is forced to the right of the FIG.s by first spring means (50) through its contact at the second longitudinal contact surface (32b) of collet (32). In this manner, collet (32) is forceably wedged into sleeve (34), applying radial force to actuator rod (20) and locking it into place, preventing further longitudinal movement of the rod, maintaining the brake pads in compression against the rotor by contact with the second end (25) of actuator rod (20), and thus locking the parking brake. As will be understood, the parking brake actuator remains locked until fluid pressure is again actively applied through the pushing means. When the pressure means is a stepper motor/threaded rod combination, release of the pressure means is accomplished by reversing the motor, thus permitting the threaded rod to release pressure on the abutting face of the closed end of cup (40).

The manner of operation of the present invention is unique, in that the parking brake actuator is structured and arranged to lock the parking brake by a force applied in a direction away from the rear face of the disk brake pads, in this case to the right direction in the FIG.s. Conversely, the parking brake actuator is structured and arranged to release the parking brake by a force applied to the collet in a direction toward the disk brake pad.

Figure 4:
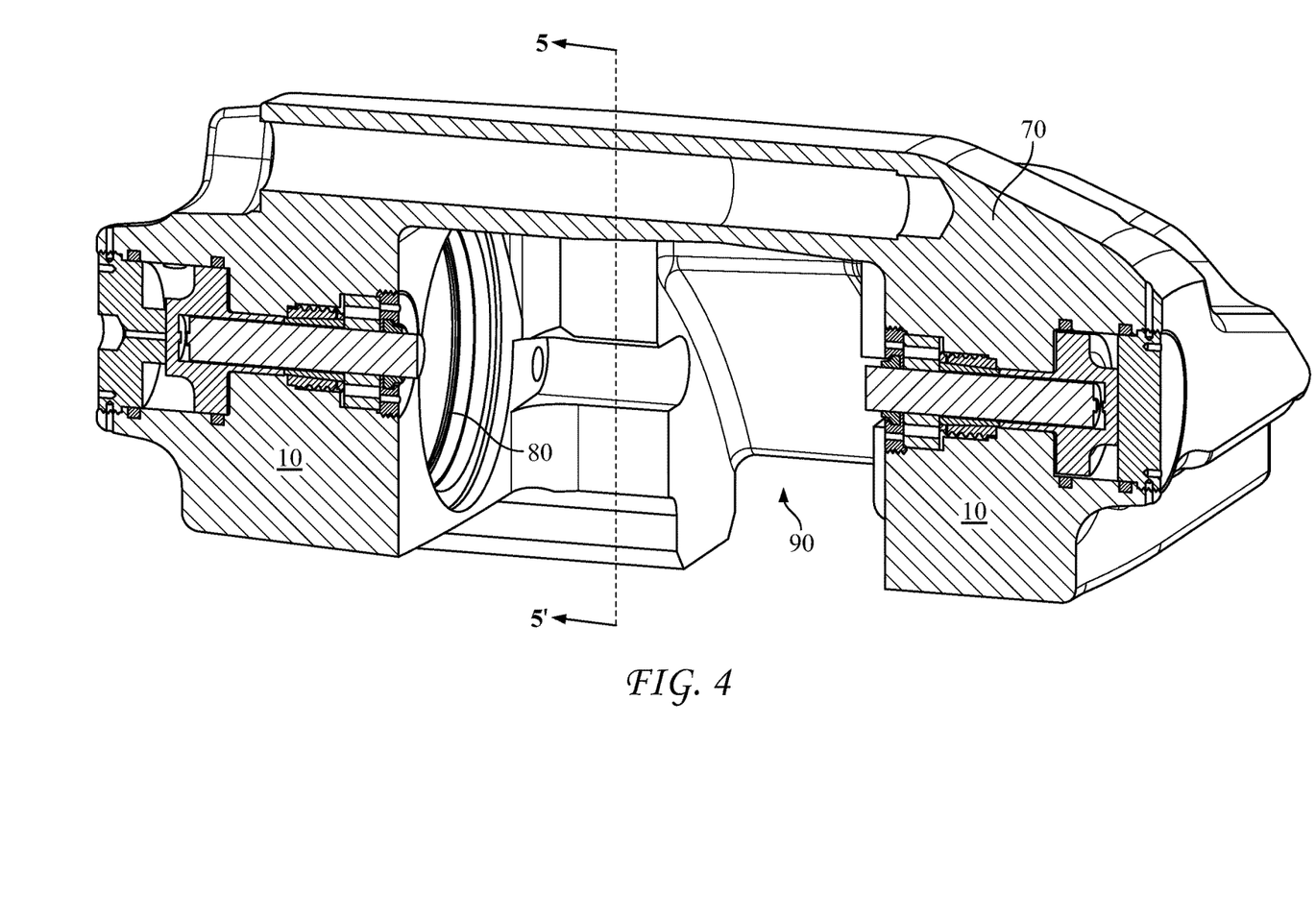
FIG. 4 is a cutaway section of a portion of a disk brake caliper incorporating two parking brake actuators according to FIG. 1.
Figure 5:
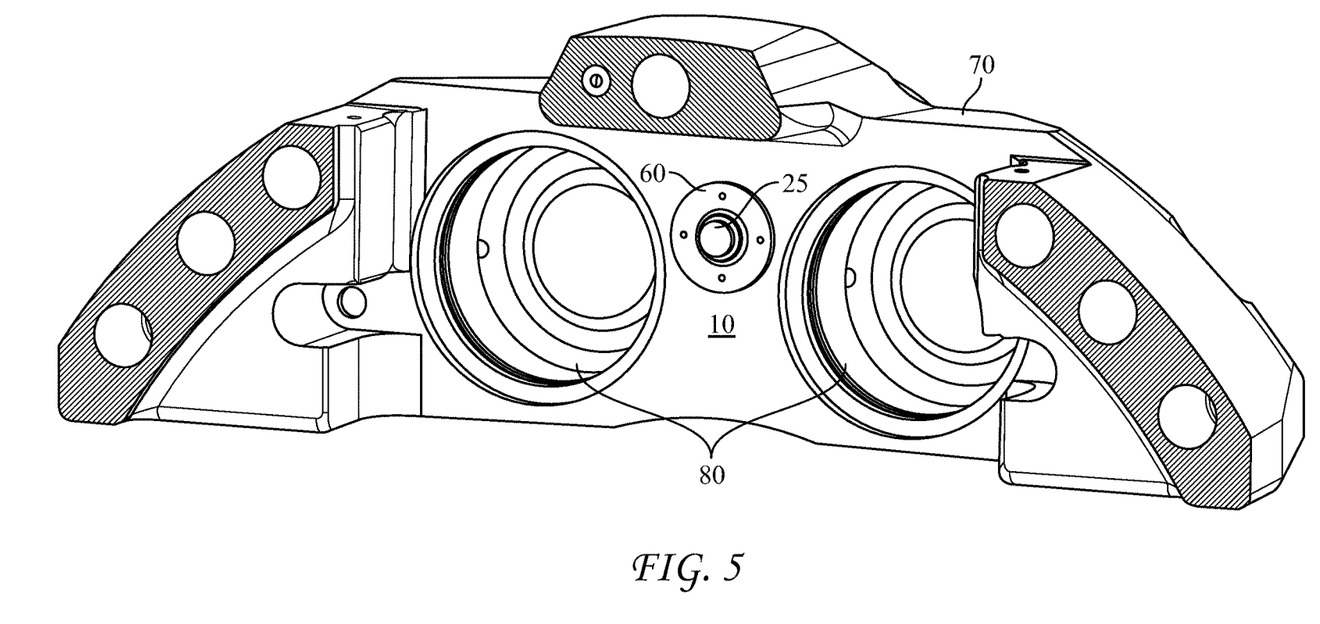
FIG. 5 is a cutaway section of FIG. 4 at line 5-5', illustrating the position of the parking brake actuator relative to the cavities for service brake pistons in the caliper.

FIG. 4 illustrates a more preferred embodiment, wherein two parking brake actuators (10) according to the present invention are incorporated into a single caliper (70) having two or more service brake activators, one parking brake actuator on either side of a rotor slot (90). FIG. 5 is a transverse section through the caliper (70) at line 5-5' of FIG. 4, and illustrates the position of the parking brake actuator(s) relative to service brake piston cavities (80) in the caliper (70). As can be seen in the FIG., second end (25) of actuator rod (20) extends through the seal in end cap (60) and into contact with the rear surface of the brake pad (not shown for clarity), midway between the service brake pistons (also not shown).

Figure 6:
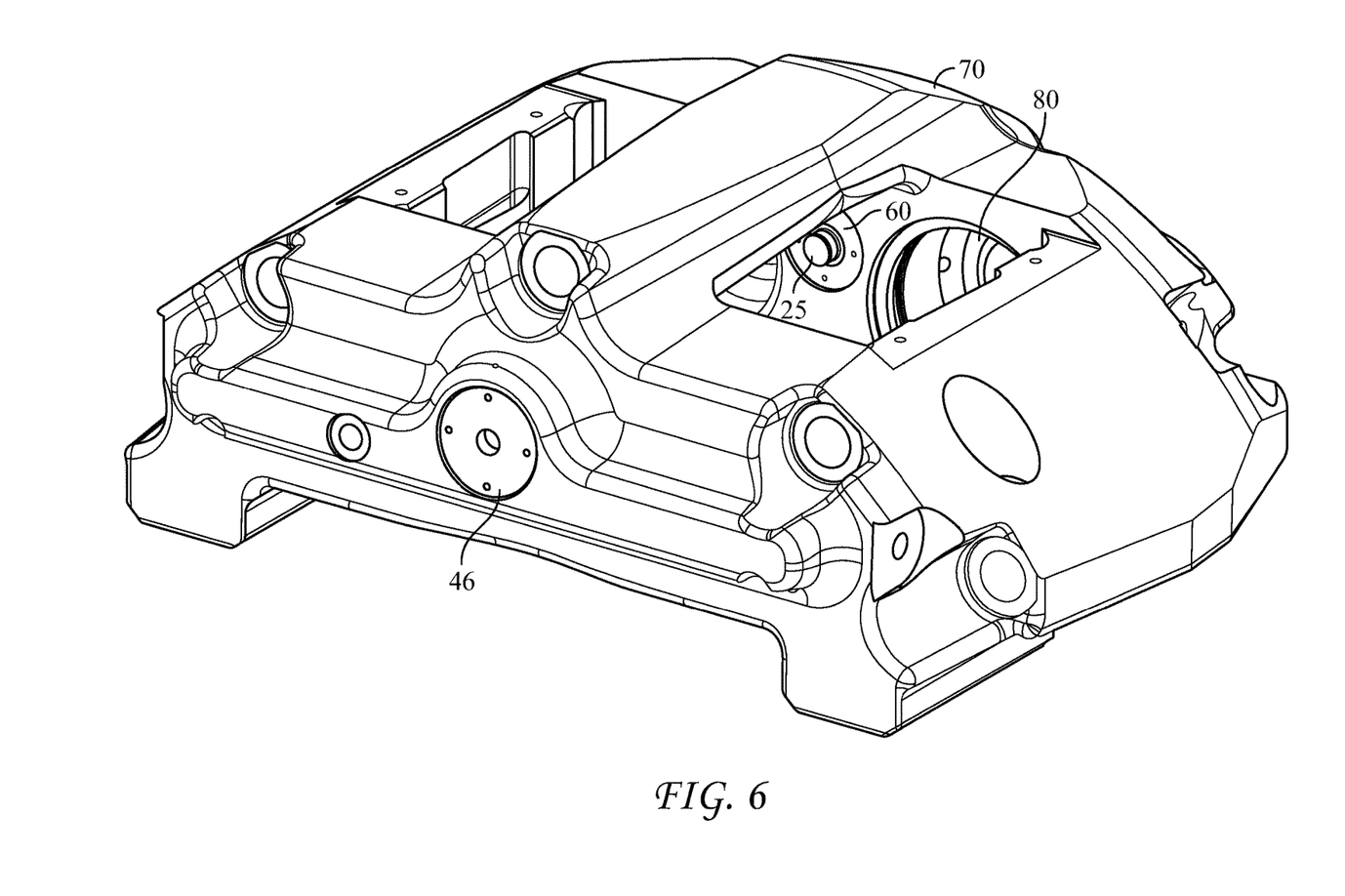
FIG. 6 is a top view of a portion of a disk brake caliper according to the present invention.

FIG. 6 is an overall view of a top portion of caliper (70), which again illustrates the positioning of both parking brake actuators in a two actuator embodiment, as can be seen from the position of pressurized fluid inlet (46) at the exterior of caliper (70) and that of end cap (60) on the interior of the caliper.

International Claims:

1. A disk brake caliper comprising a service brake actuator disposed in a first cavity therein, a parking brake actuator disposed in a second cavity therein, and a brake pad disposed against said service brake and parking brake actuators, characterized in that the parking brake actuator comprises an actuator rod disposed within a collet assembly comprising a collet within a sleeve, and is structured and arranged to lock the parking brake by a force applied to the collet in a direction away from a rear face of said disk brake pad disposed within said caliper.

2. The disk brake caliper of claim 1, wherein the actuator rod is locked by said collet assembly against said rear face of a disk brake pad when the parking brake is applied.

3. The disk brake caliper of claim 1 or 2, wherein the parking brake actuator is structured and arranged to release the parking brake by a force applied to said collet in a direction toward the rear face of said disk brake pad.

4. The disk brake caliper of any of the preceding claims, wherein the parking brake actuator further comprises: said actuator rod having said collet assembly annularly surrounding said actuator rod between first and second ends of said rod; a cup having open and closed ends, said open end disposed around said first end of said actuator rod and extending to and abutting one side of said collet; pushing means abutting the closed end of said cup opposite the first end of said actuator rod; first spring means disposed annularly around said actuator rod abutting an opposite side of said collet; and an end cap having a seat for and abutting said spring means, opposite said collet assembly from said spring means.

5. The disk brake caliper of claim 4, wherein said pushing means comprises a threaded rod connected to a motor.

6. The disk brake caliper of claim 4 or 5, wherein said motor is a stepper motor.

7. The disk brake caliper of claim 4, wherein said pushing means comprises a cylindrical chamber, a piston having a fluid contacting surface and circumferential sealing means conforming to said chamber, a fluid and a fluid inlet fitting sealing said chamber, wherein the fluid inlet communicates with said piston.

8. The disk brake caliper of claim 7, wherein the closed end of said cup is integral with said piston and opposite said fluid contacting surface.

9. The disk brake caliper of any of the preceding claims, wherein said sleeve has a cylindrical inner surface, and said collet has a tapered outer surface and first and second contact surfaces at longitudinal ends thereof, 10. The disk brake caliper of any of claims 4-9, wherein said first spring means is one or more Belleville washers or a compression spring having a spring force of about 2500 pounds.

11. The disk brake caliper of any of claims 4-10, further comprising second spring means between and abutting said first end of said actuator rod and said closed end of said cup, biasing said actuator rod into contact with said rear face of said brake pad.

12. The disk brake caliper of any of claims 4-11, wherein said second end of said actuator rod extends through a seal in said end cap and into contact with said rear face of said brake pad.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A parking brake actuator for a disc brake caliper, said parking brake actuator comprising:

a tapered collet having an axial bore, a first contact end and a second contact end, said tapered collet slidably positioned within a bore of the disc brake caliper;

an actuator rod having a first end and a second end, said actuator rod slidably positioned within said axial bore of said collet;

a piston moveably positioned within a cylindrical chamber of the disc brake caliper, having a first end for contacting said first contact end of said collet, said piston axially aligned with said actuator rod and collet, said first end of said piston structured and arranged to receive said second end of said actuator rod, said piston having a second end structured and arranged to receive a force for placing the parking brake actuator in a non-actuated condition, wherein said second end of said piston includes a circumferential sealing means conforming to the chamber;

a first biasing means in contact with the second contact end of said collet, structured and arranged to apply a force sufficient to place the parking brake actuator in an actuated condition when the force for placing the parking brake in a non-actuated condition is reduced or eliminated; and a second biasing means, said second biasing means positioned within said first end of said piston, said second biasing means structured and arranged to maintain said first end of said actuator rod in contact with a rear face of a disc brake pad of the disc brake caliper.

2. The parking brake actuator of claim 1, wherein said second contact end of said collet has an outer diameter greater than said first contact end.

3. The parking brake actuator of claim 1, wherein said first biasing means is disposed annularly about said actuator rod.

4. The parking brake actuator of claim 1, further comprising a sleeve for receiving said tapered collet, said sleeve having an outer surface for engaging the bore of the disc brake caliper, said sleeve and said tapered collet forming a collet assembly.

5. The parking brake actuator of claim 1, wherein the force for placing the parking brake actuator in a non-actuated condition is a hydraulic force.

6. The parking brake actuator of claim 1, wherein the disc brake caliper further comprises one or more fluid-actuated service brake actuators.

7. The parking brake actuator of claim 1, wherein said first and second contact ends of said tapered collet form first and second contact surfaces, respectively.

8. The parking brake actuator of claim 1, wherein said first biasing means comprises one or more Belleville washers.

9. The parking brake actuator of claim 8, wherein said one or more Belleville washers provide a spring force of between about 1000 and about 5000 pounds.

10. The parking brake actuator of claim 9, wherein said one or more Belleville washers provide a spring force of between about 2000 and about 3000 pounds.

11. The parking brake actuator of claim 1, wherein said second biasing means is a compression spring providing a spring force of about 10 to about 40 pounds.

12. The parking brake actuator of claim 1, further comprising an end cap having a seat for and abutting said first biasing means, opposite said tapered collet.

13. The parking brake actuator of claim 12, wherein said first end of said actuator rod extends through a seal in said end cap and into contact with the rear face of the brake pad.

* * * * *